Patented Oct. 7, 1941

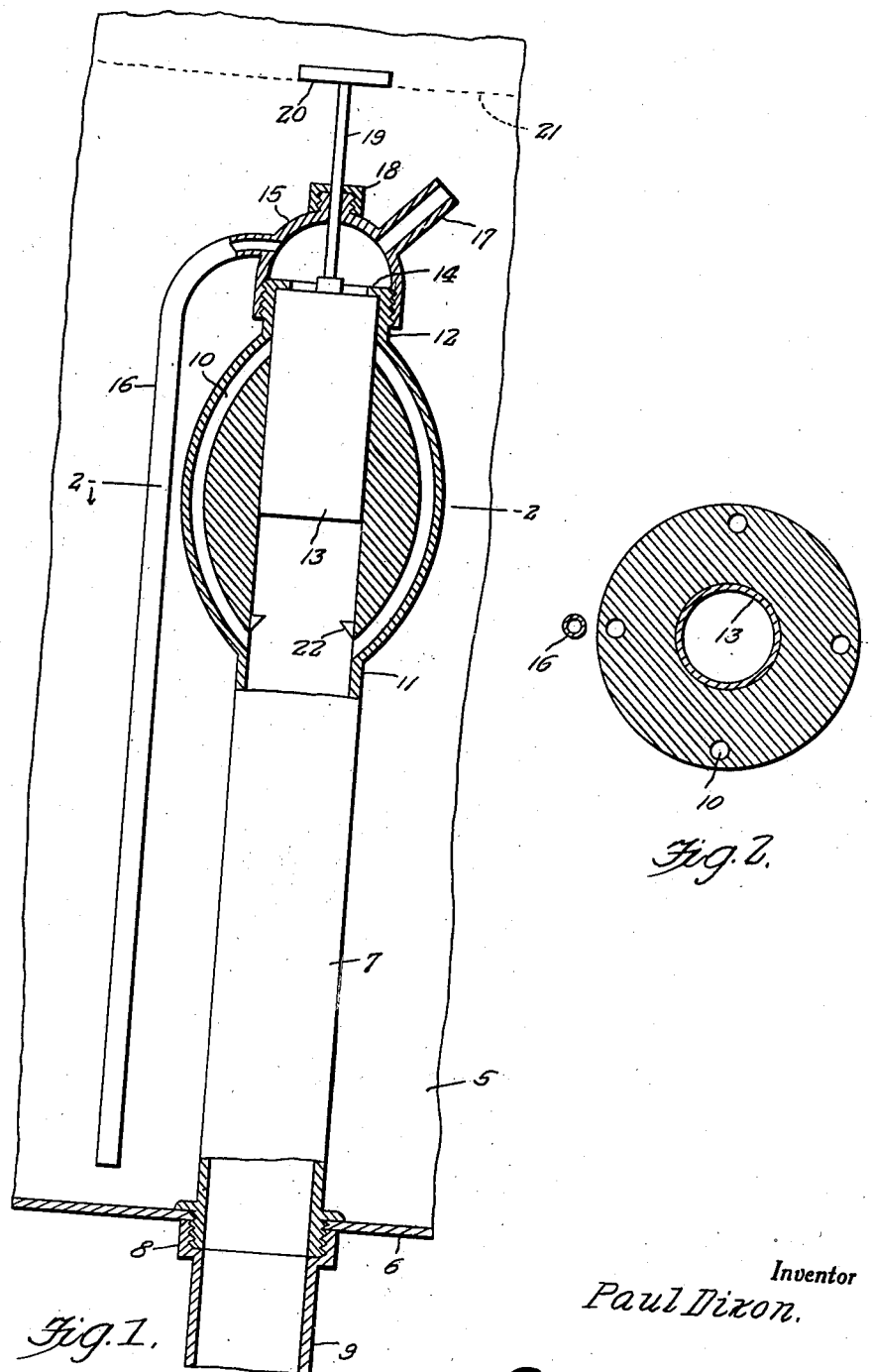

2,257,839

UNITED STATES PATENT OFFICE 2,257,839

FLUSH TANK VALVE

Paul Dixon, Omaha, Nebr.

Application August 9, 1938, Serial No. 223,979

2 Claims. (Cl. 137—104)

This invention appertains to new and useful improvements in valves such as are used in toilet flush tanks.

The principal object of the present invention is to provide a flush tank valve assembly wherein the valve element works with the pressure of the water instead of against the same, the valve element being on the pressure side of the seat, thus helping to close the valve whereas most of the types now on the market require the float to perform the action of closing the valve.

Other important objects and advantages of the invention will become apparent to the reader of the following specification.

In the drawing—

Figure 1 represents a vertical sectional view through a tank showing in side elevation the valve means with parts also in section.

Figure 2 is a sectional view on the line 2—2 of Figure 1.

Referring to the drawing wherein like numerals designate like parts, it can be seen that numeral 5 represents a flush tank having a bottom 6 formed with an opening for receiving the lower portion of a pipe section 7 which is connected at its lower end to the pipe 9, as at 8.

The upper portion of the pipe section 7 has a thickened head formed with ducts 10 extending from the points 11 to the points 12 and operative in the upper portion of the pipe section 7 is a plunger 13, the upper portion of which can strike the flanged end 14 of the pipe section 7 for maintaining the upper ends of the by-pass ducts 10 closed.

A dome 15 is provided for the upper end of the pipe section 7 and from this extends a depending pipe 16 and a refill tube 17. A packing gland 18 is provided in the upper portion of the dome 15 and through this is slidably disposed a rod 19 at the upper end of which is a float 20 which operates at the level 21 of the water.

As can now be seen, when flushing action takes place the plunger 13 descends to rest upon the protuberances 22, thus uncovering both ends of the by-pass ducts 10, so that water can readily pass through the ducts 10. When the water in the tank reaches a certain level, and begins to carry up the float 20, the plunger 13 is again lifted to the position shown in Figure 1, thus closing off the upper ends of the by-pass ducts 10.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A flush tank valve comprising a vertical water supply pipe terminating in an enlarged head having a passage therethrough forming a continuation of the pipe interior head, a plunger vertically movable in the head, a by-pass extending substantially vertically in the head and having its ends communicating with the passage of the head at vertically spaced points, said plunger being of a length shorter than the distance between the ends of the by-pass and adapted to close the upper end of said by-pass when moved to its uppermost position, a stop in the head for supporting the plunger when in lowered position, said stop being located above the lower end of the by-pass and a float operative above the head and provided with a connection to said plunger.

2. A flush tank valve comprising a vertical water supply pipe terminating in an enlarged head having a passage therethrough forming a continuation of the pipe interior head, a plunger vertically movable in the head, a by-pass extending substantially vertically in the head and having its ends communicating with the passage of the head at vertically spaced points, said plunger being of a length shorter than the distance between the ends of the by-pass and adapted to close the upper end of said by-pass when moved to its uppermost position, a stop in the head for supporting the plunger when in lowered position, said stop being located above the lower end of the by-pass and a float operative above the head and provided with a connection to said plunger, said head being provided with an upwardly disposed and threaded extension having an inwardly disposed stop flange for engagement by the plunger to limit its upward movement, an internally threaded dome disposed over the threaded extension, a packing gland in the dome, said connection consisting of a stem extending from the plunger to the float and through the packing gland, and a filler neck extending from the dome.

PAUL DIXON